UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

RING-SHIELD FOR GLASS-DRAWING APPARATUS.

1,231,776.   Specification of Letters Patent.   Patented July 3, 1917.

Application filed February 18, 1916, Serial No. 79,060. Renewed November 24, 1916. Serial No. 133,266.

*To all whom it may concern:*

Be it known that I, WILLIAM L. MONRO, a citizen of the United States, residing at Pittsburgh, Allegheny county, Pennsylvania, have invented a new and useful Ring-Shield for Glass-Drawing Apparatus, of which the following is a full, clear, and exact description, reference being had to the accompanying drawings, forming part of this specification, in which—

Figure 1:
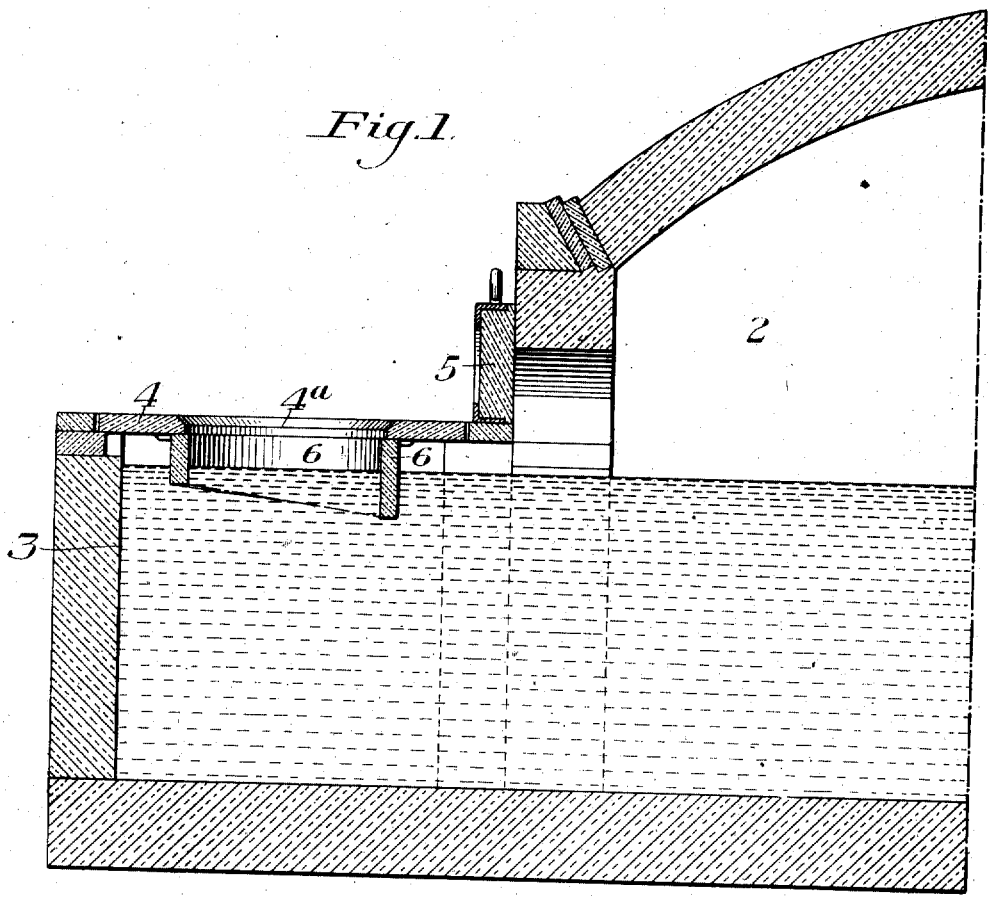
Figure 2:
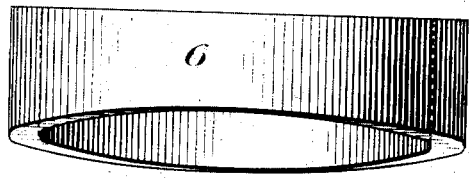

Figure 1 is a partial vertical section of a glass furnace provided with my improved ring shield, and Fig. 2 is a front elevation of the ring shield on a larger scale.

My invention relates to refractory rings used for drawing glass from a bath which is a part of or extension of the glass bath in a tank furnace. In drawing glass from such a bath, it is difficult to obtain glass of the same temperature throughout the portion within the drawing ring, owing to the glass being of different temperatures within the portion of the bath containing the ring. The temperature of the glass will be hotter near the upper portions of the bath and cooler in the deeper portions, and the outer portion near the outer wall will be, as a whole, cooler than the inner portions nearer the main body of glass.

To overcome the difficulty of the glass being of different temperatures within the ring, I employ a ring whose inclosing wall is deeper at some portions than at other portions. As the deeper portions will take glass from the deeper portions of the bath, I can, by turning the ring to the right position, substantially equalize the temperature of the glass within the ring.

In the drawings 2 represents a portion of a tank furnace having a drawing opening formed in an extension 3 thereof. 4 represents the topstone of this extension, and 5 a vertically movable shield to cut off the heat of the furnace. 6 is the drawing ring, which may either be made to interfit with the under edge of the drawing opening 4ª through the topstone, or may simply contact with the bottom of the topstone, as desired. This ring is preferably a floating ring, and certain portions of its wall are made deeper than other portions, its lower edge preferably being curved or inclined downwardly from one side to the other, as shown.

In the use of the ring, it is adjusted to the proper position so that the deepest edge of the ring will lie in the generally hotter portion of the bath. Consequently, the glass entering this deeper portion of the ring will be drawn from deeper portions of the glass bath, and thus have more nearly the temperature of the upper portion of the cooler part of the glass bath. In the form shown, where the furnace extension is used, the deeper portion of the ring will therefore be located nearest the main body of glass in the furnace, since in this form the outer portion of the body of glass containing the ring will be cooler on account of radiation, etc. The ring is always held by the top-stone in an upright position, thereby maintaining therein a symmetrical body of glass around the drawing point.

The advantages of my invention will be apparent to those skilled in the art, since the differing depths of the ring wall will act to take glass from different depths and thus equalize the temperature of the glass from which the cylinder or other article is drawn.

The ring may be made of any desired shape other than circular, and other changes may be made without departing from my invention.

The ring may be floated in and out of position between the drawing operations, or may remain in position and the glass be melted back within the ring between the drawing operations. The ring may also be secured to the topstone if desired, and may be turned around to different positions, the same as though it were floating in the bath.

I claim:

1. In glass drawing apparatus, a ring arranged to surround the drawing point and dip in a glass bath, the lower edge of the immersed portion of the ring having portions at different levels to provide for entrance of glass from different levels below the surface of the bath, together with means for holding said ring in a position to provide a symmetrical body of glass around the drawing point, substantially as described.

2. In glass drawing apparatus, a floating refractory ring having a portion thereof immersed in the glass bath, the immersed portion extending to different depths, and the deeper portion being within the hotter portion of the glass bath, together with means for holding said ring in a position to provide a symmetrical body of glass around the drawing point, substantially as described.

3. In glass drawing apparatus, a refractory ring adapted to surround the drawing point and having a portion immersed in the glass bath, the immersed portion extending to different depths, the deeper portion being arranged within the hotter portion of the glass bath, together with means for holding said ring in a position to provide a symmetrical body of glass around the drawing point, substantially as described.

In testimony whereof, I have hereunto set my hand.

WILLIAM L. MONRO.

Witnesses:
ALICE A. TRILL,
GEO. H. PARMELEE.